United States Patent [19]

Horner et al.

[11] 4,032,402
[45] June 28, 1977

[54] CYLINDRICAL PRESTRESSED CONCRETE TANK FOR A NUCLEAR POWER PLANT

[75] Inventors: Malcolm Horner, Wolviston, England; Alija Hodzic; Dirk Haferkamp, both of Mannheim, Germany

[73] Assignees: Hochtemperatur-Reaktorbau GmbH, Cologne, Germany; Taywood Engineering Limited,, Southall, United Kingdom

[22] Filed: May 4, 1976

[21] Appl. No.: 683,074

[52] U.S. Cl. .................................. 176/87; 176/38; 52/224
[51] Int. Cl.² ...................................... G21C 13/04
[58] Field of Search ................ 176/38, 87; 52/224, 52/223, 248, 249

[56] References Cited
UNITED STATES PATENTS

| 3,371,017 | 2/1968 | Coast et al. ......................... 52/224 |
| 3,540,176 | 11/1970 | Hosegood et al. ................... 52/224 |
| 3,950,840 | 4/1976 | Dietrich .............................. 52/224 |

FOREIGN PATENTS OR APPLICATIONS

| 107,691 | 6/1967 | Denmark ............................ 176/87 |
| 1,041,041 | 9/1966 | United Kingdom ................. 176/87 |

*Primary Examiner*—Peter A. Nelson
*Attorney, Agent, or Firm*—Toren, McGeady and Stanger

[57] ABSTRACT

A cylindrically shaped prestressed concrete tank for a gas-cooled high temperature nuclear reactor plant includes a centrally located chamber for the reactor with a number of horizontally extending compartments located below the reactor chamber and at least two different groups of vertically extending compartments located radially outwardly from reactor chamber. The tank is prestressed by vertically extending tensioning elements and two different groups of horizontally extending tensioning elements. One group of horizontally extending tensioning elements extend chordally alongside and for the vertical range of the horizontal compartments and are anchored on the outer surfaces of the tank. The other group of horizontal tensioning elements are ring-shaped and extend in channels around the outer surface of the tank. This other group is located above and below the vertical range of the horizontal compartments.

13 Claims, 5 Drawing Figures

4,032,402

CYLINDRICAL PRESTRESSED CONCRETE TANK FOR A NUCLEAR POWER PLANT

SUMMARY OF THE INVENTION

The present invention is directed to a cylindrical prestressed concrete pressure tank for a nuclear power plant and the tank is arranged to hold a gas-cooled high-temperature reactor and at least one heat utilization circuit including a turbine, compressor and heat exchange apparatus with the reactor located within a centrally arranged chamber in the tank. The components of the heat utilization circuit are positioned in individual compartments located within the tank. The individual compartments are closed to the exterior of the tank.

As is known, every nuclear reactor, regardless of the type, must be enclosed by a casing which is impermeable to harmful radiation to afford a shield blocking the escape of radiation produced in the reactor core during nuclear fission. Furthermore, pressurized reactors, that is, reactors which are cooled by a pressurized fluid, which is usually a gas, must be enclosed in a completely tight and pressurized casing, a so-called pressure tank. According to the present state of the art, the radiation shield and the pressure tank are combined to afford a sealed pressurized casing which provides the functions both of biological radiation protection and of a complete seal for retaining the pressurization of the nuclear reactor. Such a casing is formed of concrete in which substantially inwardly directed initial stresses are produced by means of tensioning elements, for increasing the pressure resistance and sealing characteristics of the casing and the stresses produced are greater than those caused by the pressurization of the coolant within the reactor.

Accordingly, the primary object of the present invention is to provide a cylindrically shaped prestressed concrete pressure tank for a nuclear power plant where the volume of the tank is maintained relatively small by a special arrangement of the components of the plant and where the prestressing of the tank is accomplished in an economical manner which ensures the requisite safety.

In accordance with the present invention, a prestressed concrete tank is provided with a centrally arranged reactor chamber and at least one horizontally arranged compartment located below the reactor chamber for receiving a gas turbo-set. Further, a number of vertically extending compartments are provided in a circle around the reactor chamber for gas-carrying lines with additional vertical compartments arranged in a second larger circle around the chamber for heat exchange apparatus. The entire pressure tank is prestressed as a homogeneous concrete body by longitudinal tensioning elements some of which extend in the axial direction of the tank while others are disposed substantially perpendicularly to the axis. The tensioning elements extending perpendicularly of the tank axis are provided in two groups, one group is located in the vertical range of the horizontal compartment below the reactor chamber with the elements extending chordally of the tank while the other group are ring-shaped and extend around the periphery of the tank above and below the vertical range of the horizontal compartments.

There are a number of known cylindrically-shaped concrete pressure tanks for nuclear reactor plants which are prestressed both in the axial direction of the tank and in a direction transverse to the axis, the initial stress is applied by reinforcement which extends through the tank walls parallel to the axis and is anchored at the opposite end faces of the tank in top and bottom terminal plates. The prestressing applied transversely of the axial direction is accomplished in various ways.

For example, DOS 1,098,114 and DOS 1,684,617 disclose prestressed concrete pressure tanks where the prestressing perpendicular to the tank axis is produced by cylindrical or practically cylindrical hoops which embrace the tank in planes perpendicular to the axis and are evenly distributed over the tank height. This system, applied according to the so-called winding method, has the advantage that the anchorages of the tensioning elements are accessible on the exterior of the tank and can be monitored during the operation of the reactor.

In another type of prestressed concrete pressure tank, the tensioning elements disposed transversely of the tank axis, that is, horizontally, are ring-shaped and located within the tank wall, so that the necessary tensioning action in the tangential direction is produced in the concrete. Such a prestressing system is shown in the concrete pressure tank disclosed in DOS 1,185,362 and described in the article by H.B. Schrage, Techn. Mitt. Krup, Vol. 26 (1968), page 81. In this example, the ring wall tank is used for a thorium high-temperature reactor operating at 300 MMe.

Another prestressed concrete pressure tank with tangentially extending horizontally arranged pre-tensioning members is disclosed in DOS 1,684,651. The pre-tensioning elements are divided into groups which span 180° and are staggered relative to one another. Similar to the above mentioned prestressed concrete pressure tanks, this tank is also designed as a hollow cylinder with the hollow interior serving to receive the reactor core. However, unlike the previously mentioned tanks, it has a number of compartments extending perpendicularly through the cylindrical wall and arranged on a circle around the hollow interior. The pre-tensioning elements are disposed within the concrete but radially outwardly from the compartments in the cylindrical wall.

In DOS 1,684,699 a prestressed concrete pressure tank is illustrated which is not cylindrical in shape, however, it is traversed by pre-tensioning elements extending in the direction of the tank axis and in the circumferential direction around the axis. This tank is intended for a high-speed, steam-cooled breeding reactor and encloses, apart from the reactor core, heat exchange units with the respective coolant blowers and coolant connecting lines arranged separately around the core. In the represented embodiment, the heat-exchanger units with the coolant blowers are arranged in individual vertical shafts, but the turbine units are integrated in the prestressed concrete pressure tank and usable steam is led from the pressure tank through a line having a relatively small cross section.

Apart from the axially and circumferentially extending reinforcement in this pressure tank, horizontal prestressing elements are provided which extend through the partitions between the reactor core and the heat-exchanger units, intersecting each other and surrounding the unit shafts in a U-form. The arms of the reinforcing enclose the chamber for the reactor core.

A further prestressed concrete pressure tank with compartments for the heat exchangers extending through the reactor wall is shown in DOS 1,539,887. The tank is used in a partly integrated part where the heat exchangers and the reactor core are located in the same tank. The prestressing action is provided, on one hand, by vertical pre-tensioning elements and by pre-tensioning elements laid around the circumference of the tank, and on the other hand, by pre-tensioning elements arranged in the top and bottom terminal plates of the tank, which elements extend along chordal paths in three principal directions.

Additional tensioning wires are arranged in horizontal planes traversing the partitions between the compartments for the heat exchangers in superposed planes, and also extending in chordal paths.

Unlike these known prestressed concrete pressure tanks, the tank embodying the present invention is used in an integrated nuclear reactor plant where not only the heat exchanger apparatus but also the turbine unit are arranged in the tank. To reduce the dimensions of the tank substantially, a compact construction is used and involves the placement of the gas turboset in a horizontally extending compartment located below the reactor chamber. Further, compartments are also provided within the concrete tank structure not only for the heat exchange apparatus but also for the gas-conveying lines. To impart sufficient strength to such a prestressed concrete pressure tank, a special reinforcement of the cylindrically shaped concrete structure is required. Therefore, the present invention involves an arrangement of the tensioning elements into three groups, one group of the elements extend in chordal paths across the tank in the vertical range of the horizontal opening or compartment for the turboset, another group has circumferentially extending elements disposed about the outer surface of the tank and the third group extend through the tank structure parallel to its axis.

Another advantageous feature of the present invention is the provision of three horizontal compartments disposed in the same vertical range and equiangularly spaced apart below the reactor core chamber in the tank. The group of tensioning elements extending chordally of the tank are arranged in three sub-groups disposed at 120° to one another, that is, in the direction of the three horizontal compartments. In each of the sub-groups the tensioning elements extend laterally outwardly from both sides of the horizontal compartment with the open space therebetween accommodating the compartment which extends for only a portion of the diameter of the tank.

For an intermediate portion between their opposite ends, the chordally extending tensioning elements are rectilinear, however, at their ends the elements have a curvilinear shape and are secured to anchoring members on the outer surface of the tank. The anchoring members are evenly spaced apart with the exception of those members which are adjacent to the opening into the horizontal components on the outer surface of the tank. In each of the sub-groups, the elements are spaced apart in both the horizontal and vertical directions so that a plurality of vertically extending rows are provided on each side of the horizontal compartments. As the chordally arranged elements extend through the tank, some the elements in the vertical rows are displaced upwardly and the others are displaced downwardly out of the path of the other horizontal compartments. As a result, the compartments are free of any tensioning elements, while they are laterally enclosed on all sides by the tensioning elements.

It is preferred if grooves are formed in the outer surface of the tank at the location of the anchoring members for the chordally extending tensioning elements. In these grooves, the bases extend perpendicularly of the direction of the tensioning elements.

In addition to vertical compartments aligned above the horizontal compartments, other vertical compartments are arranged spaced laterally of the horizontal openings and they are positioned so that the chordally extending tensioning elements are distributed symmetrically to them along the portions of the elements outwardly from the intermediate portions, which portions have slightly curvilinear paths.

Similar to the vertical compartments for the heat exchangers and the gas-carrying lines, the horizontal compartments are arranged to be pressurized and are equipped with prestressed concrete plugs at their openings in the outer surface of the tank.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE INVENTION

Figure 1:
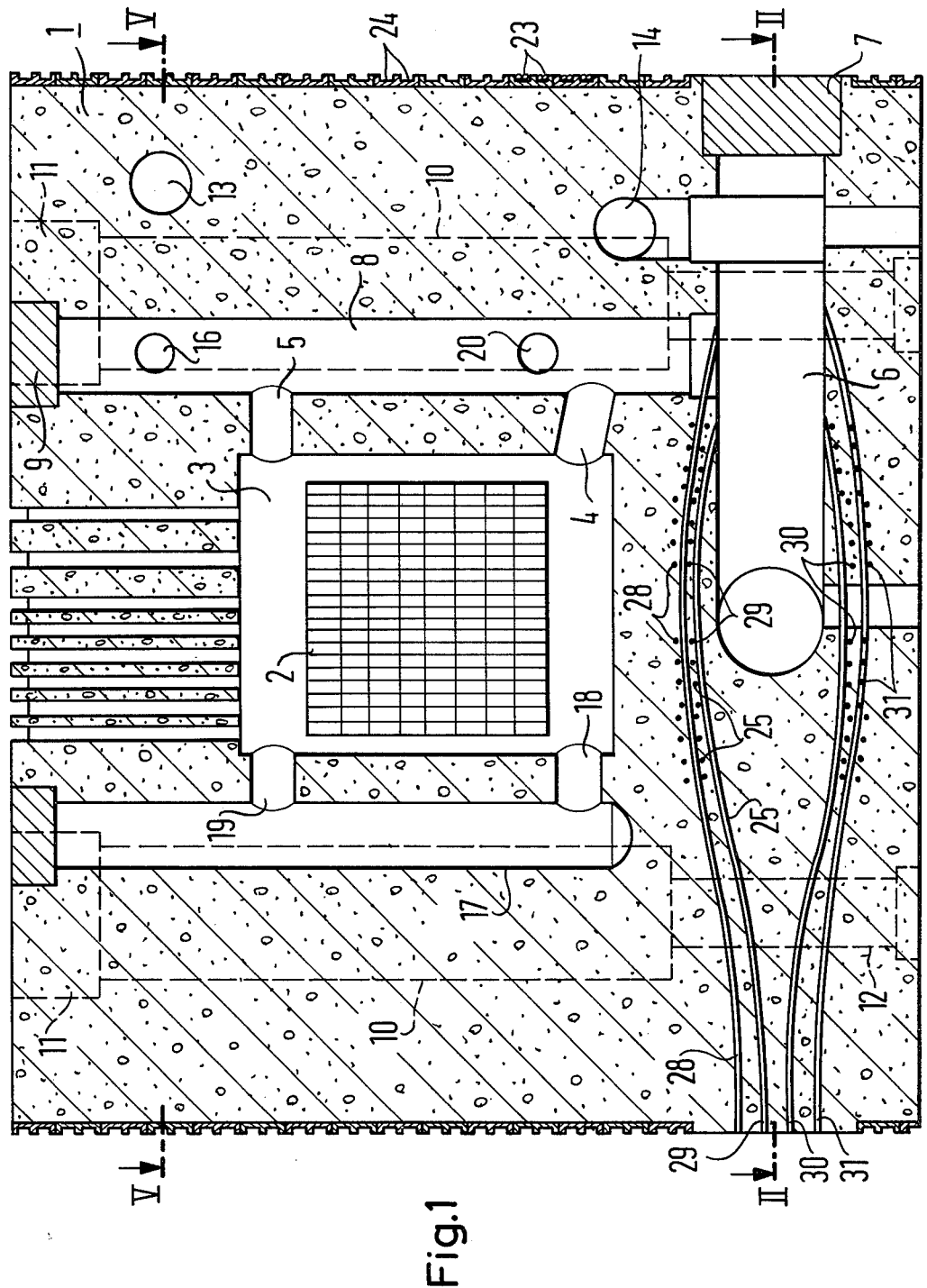
FIG. 1 is a vertical sectional view through a prestressed concrete pressure tank embodying the present invention and taken along the line I-I of FIG. 2.

In the drawing, a cylindrically shaped, vertically extending prestressed concrete pressure tank 1 is represented and the tank is centrally located within a cylindrical safety tank of steel concrete, not shown. Centrally positioned within the prestressed concrete pressure tank 1 is a nuclear reactor 2 and also located in the tank is the primary circuit of the reactor plant which includes three heat utilization circuits connected in parallel and coupled to the reactor 2. Each of the parallel-connected circuits includes a turbine, a compressor, a recuperator and a cooler, all of which are positioned within compartments formed in the pressure tank, of which a further description is provided below.

The nuclear reactor 2 is a graphite-moderated, helium-cooled high temperature reactor having fuel cells of a spherical or block shape. The reactor is located within a centrally arranged chamber 3 spaced inwardly from the top, bottom and circumferentially extending surfaces of the tank. Three radially arranged outlet pipe connections 4 extend between the reactor and each of the three circuits of the primary circuit and three radially extending inlet pipe connections 5 are also provided, note FIG. 1.

Figure 2:
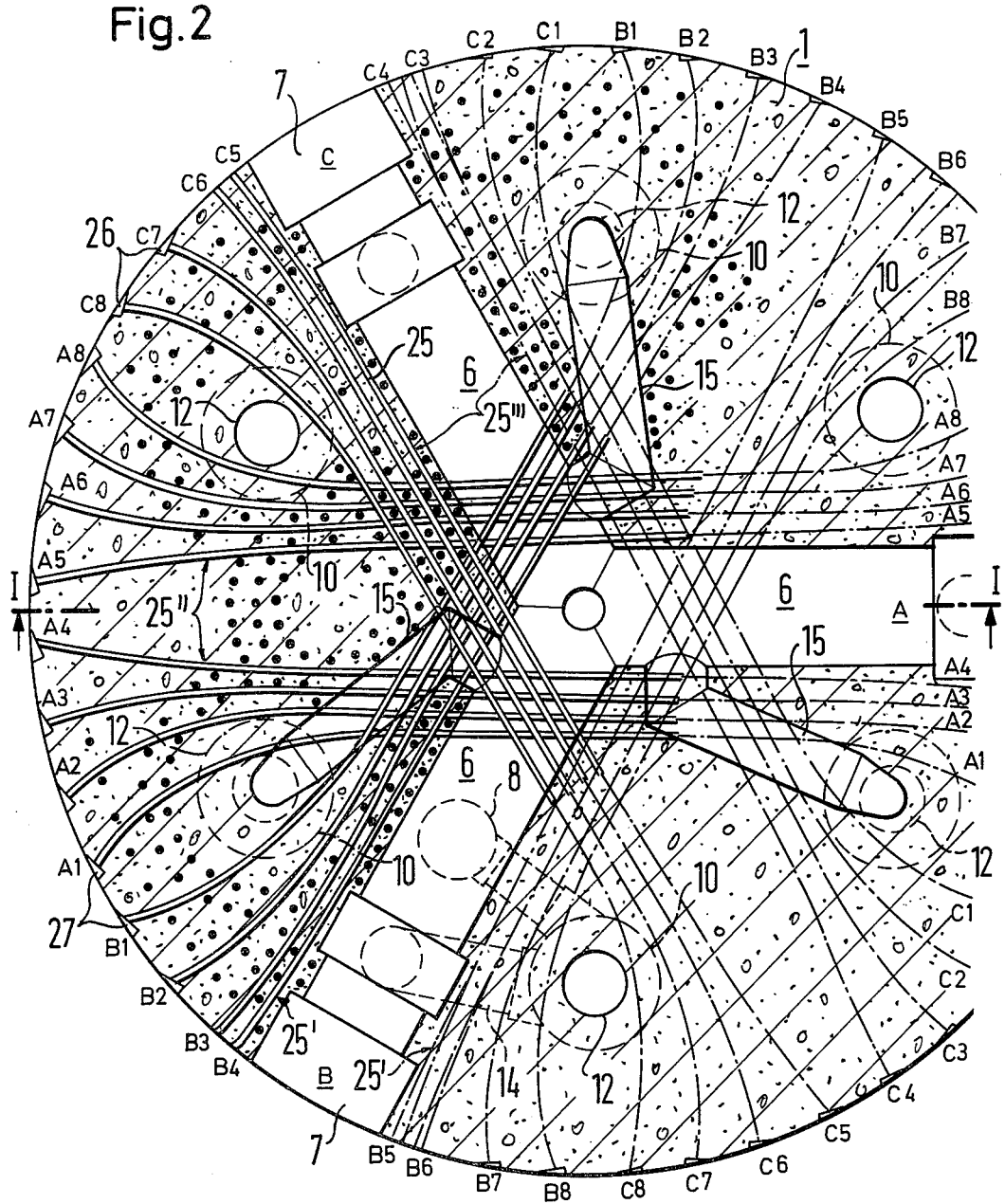
FIG. 2 is a vertical sectional view taken along the line II-II of FIG. 1.

Positioned below the high temperature reactor 2 in the chamber 3 are three horizontally extending compartments 6 each equipped with a prestressed concrete plug 7 at the opening of the compartment located in the outer circumferential surface of the tank. In horizontal section, as can be seen in FIG. 2, the three compartments 6 are equiangularly spaced apart, having a star-shape form, with the compartments intersecting at the cylindrical axis of the tank 1. Though not shown, each of the horizontal compartments is arranged to contain a single-shaft gas turbine as well as a compressor which is coupled to the turbine over a common shaft. Aligned above and connected to each of the horizontal compartments 6 is a gas-carrying line compartment 8. The three vertically extending compartments 8 are arranged symmetrically on a circle concentric to the cylindrical axis of the pressure tank. Spaced above the horizontal compartments 6 are the reactor outlet pipe connections 4 which extend between the chamber 3 and the vertical compartments 8. Each of the vertical compartments 8 is provided, at the upper surface of the tank, with a burst-proof cover 9.

Additional vertically extending compartments 10 are provided within the concrete pressure tank and they are symmetrically arranged about a circle having a larger diameter than the circle of the compartments 8. Further, burst-proof covers 11 seal the upper ends of the compartments 10 in the top surface of the tank. The compartments 10 are arranged to receive the heat-exchanging apparatus and two compartments are provided in each of the three circuits with one compartment containing a recuperator and the other a cooler which are positioned in the vertical compartments at the same level or in the same vertical range as the reactor chamber 3. The heat exchanger apparatus is not illustrated in the drawing. Each of the two vertical compartments 10 associated with a horizontal compartment 6 are spaced symmetrically on opposite sides of the horizontal compartment, note FIG. 5. At their lower ends, each of the vertical compartments 10 has a reduced diameter compartment 12 extending downwardly to the lower surface of the tank. The reduced diameter compartments 12, as can be seen in FIG. 1, extend through the vertical range of the horizontal compartment 6. The reduced diameter compartments 12 provide the possibility of making inspections and repairs in the superposed vertical compartments 10.

Figure 5:
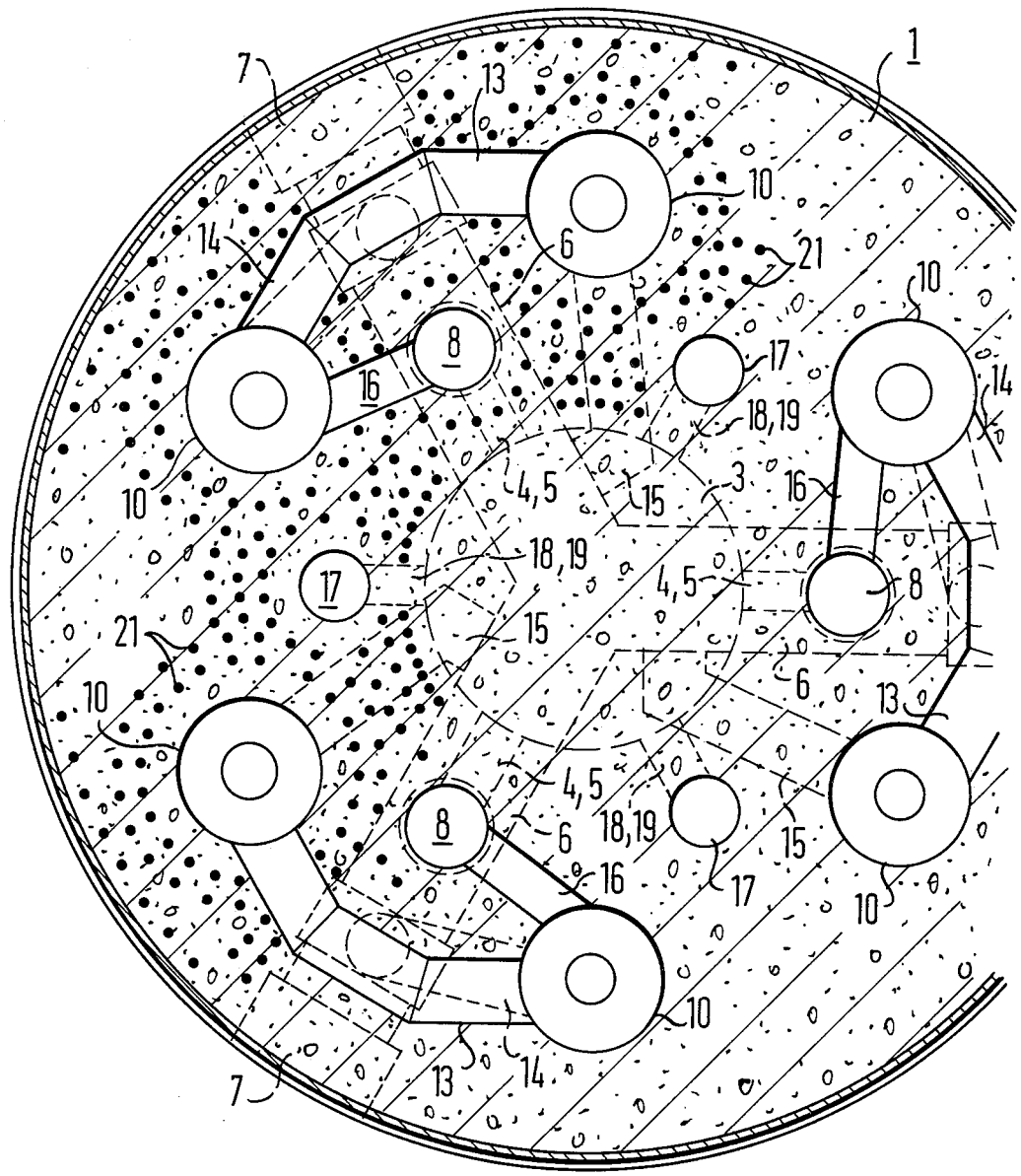
FIG. 5 is a horizontal sectional view taken along the line V-V in FIG. 1.

As shown in FIG. 5, each of the heat utilization circuits includes a horizontal conduit 13 located in the upper range of the tank 1 which connects the two vertical compartments 10 in a circuit and the conduit affords the passage of gas between the recuperator and the cooler in each circuit. For a preferred arrangement, as shown in FIG. 5, the horizontal conduits 13 are formed of axially extending angularly disposed sections. Another gas pipe 14, note FIGS. 1, 2 and 5, connects the turbine in each circuit with its associated recuperator with the pipe extending upwardly from the horizontal compartment and then extending laterally into the lower end of the corresponding vertical compartment 10. The connection of the cooler and the compressor in each circuit is accomplished over another gas pipe 15 which extends laterally from the bottom of one of the vertical compartments 10 and opens into the associated horizontal compartment 6 in the range of the compressor.

The cooled gas is conducted from the compressors to the recuperators of the three circuits through the vertically extending compartments 8 aligned above the turbines with the gas flowing at first on the outside along the hot gas pipes originating from the nuclear reactor, which are designed as coaxial gas lines. At the upper end of each vertical compartment 8 there is a horizontal connecting line 16 to the associated vertical compartment 10 in which a recuperator is positioned. The gas reheated in the recuperators flows through three additional gas lines which emerge from the bottom of the compartments containing the recuperators and open into the vertical compartments 8. The mouth 2D of one of these gas lines is shown in FIG. 1.

Three coaxial lines, not shown, extend upwardly through the vertical compartments 8 and convey the gas to the reactor inlet pipe connections 5.

Apart from the three vertical compartments 8 for the gas-carrying lines, and the six vertical compartments 10 for the heat-exchanger apparatus, three further compartments 17 are provided within the pressure tank 1 and these compartments have a smaller diameter than the compartments 8 and are arranged symmetrically on a smaller circle than the compartments 8. These vertical compartments 17 are staggered between the gas-carrying line compartments 8 and serve to receive an afterheat emission system, not shown. Such a system takes hot gas from the three hot gas pipes 18 from the reactor core, note FIG. 1, cools and compresses the gas before it is fed through a line 19, note FIG. 1, into the upper end of the nuclear reactor on the cold gas side.

Figure 4:
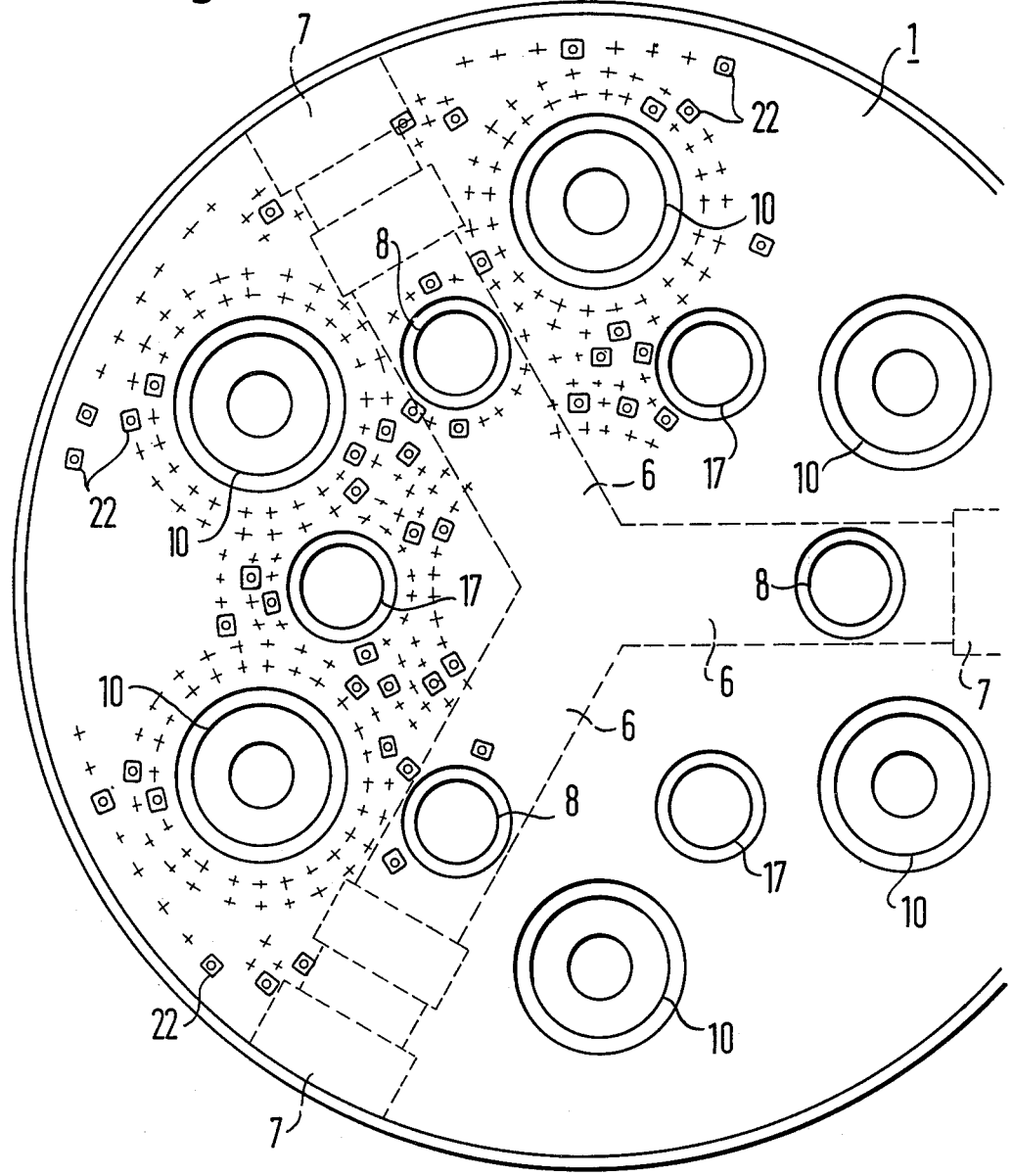
FIG. 4 is a top view of the tank illustrated in FIG. 1.

FIGS. 4 and 5 show the manner in which the vertical tensioning of the concrete tank is achieved. Tensioning cables 21 are arranged, in accordance with the BBRV-system, in parallel with the cylindrical axis of the tank, within the concrete and at one end of the cables are secured in an anchor head embedded in the concrete. At the other end of the cable 21, grips 22 are secured on which the necessary tensioning force is exerted, for example, by means of hydraulic devices, note FIG. 4.

The stressing of the concrete tank in the direction perpendicularly to the cylindrical axis is achieved by a plurality of tensioning elements 23 wrapped around the outer circumference of the tank over its vertical height, however, with the exception of that portion of the vertical height in which the horizontal compartments 6 are located. The tensioning elements 23 are disposed in planes extending perpendicularly to the cylindrical axis and are uniformly distributed over the height. As shown in FIG. 1, the ring-shaped tensioning elements 23 are positioned in channels 24 extending around the circumference of the tank. To produce the necessary prestressing forces, a much greater number of tensioning elements is required than illustrated, and in actual construction the elements are arranged in superposed layers on the outer surface.

Figure 3:
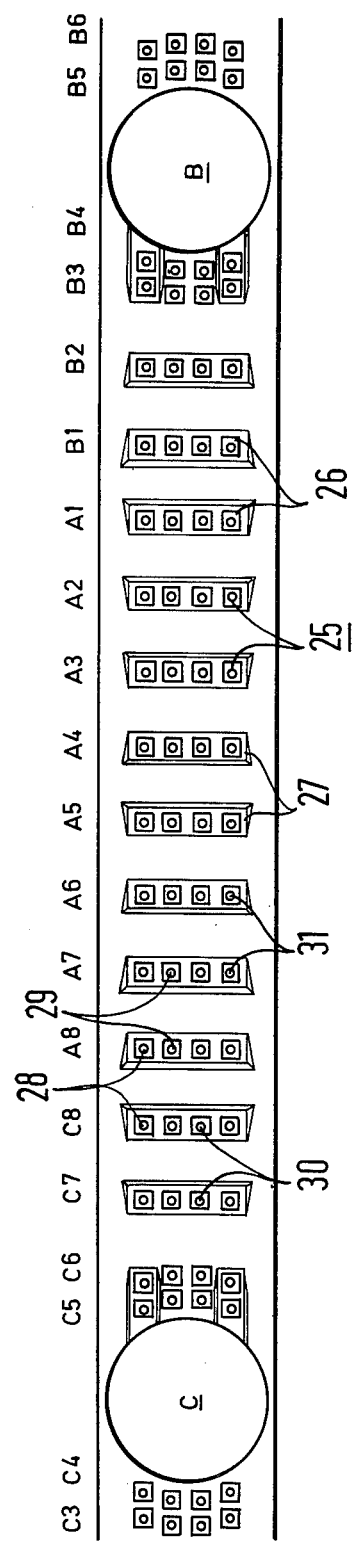
FIG. 3 is a developed view of approximately 1/3 of the outer surface of the prestressed concrete tank in the vertical range of the horizontally extending components shown in FIGS. 1 and 2.

FIGS. 1, 2 and 3 illustrate the arrangement of the horizontal prestressing of the pressure tank in the vertical range of the horizontal compartment 6. As can be seen in FIG. 1, the tensioning stresses are produced by positioning tensioning elements 25 in substantially chordal paths extending through the concrete part of the tank 1. The tensioning elements 25 are divided into three sets 25', 25'', 25''' with each set associated with one of the horizontal compartments 6. Accordingly, the tensioning elements in each set extend generally in the axial direction of the horizontal compartment with which they are associated and, since the compartments are equiangularly spaced apart, the sets are each disposed at approximately 120° to one another. The horizontal tensioning elements 25 in each set are divided into two sub-sets each on an opposite side of the compartment with which they are associated so that a free or open space extends through the concrete. It is in these three open spaces that the horizontal compartments 6 are located. As can be noted from FIGS. 1 and 2 on each side of the compartments 6, the tensioning elements are spaced in both the horizontal and vertical directions with four vertical rows of four elements. The intermediate portions of the fastening elements 25 in each of the sets extend in a rectilinear chordal path in generally parallel relation with the axis of the horizontal component with which they are associated. The end portions of the elements, extending from the rectilinear intermediate portions to the outer surface of the tank, have a curvilinear shape. The curvilinear portions of the tensioning elements 25 are arranged so that the anchoring points 26 of the elements on the outer surface of the tank are evenly spaced apart, except for those elements located immediately adjacent the openings from the compartments 6 in the outer surface of the tank, which openings are closed by the plugs 7. As can be noted in FIG. 3, vertically extending grooves 27 are provided in the outer surface of the concrete tank 1 in which the anchoring points 26 are located. The grooves 27 are shaped so that their bases extend perpendicularly of the direction of the tensioning elements as they enter the grooves.

Spaced laterally outwardly on each side of the horizontal components 6, in the vertical range of the compartments are the vertical compartments 12. As can be seen in FIG. 2, the end portions of the tensioning elements 25 are curved around the vertical compartments 12 so that the elements are displaced laterally outwardly of the path of these compartments. The tensioning elements on each side of the compartments 12 belong to different sets of the elements, for instance, in FIG. 2, the vertical compartment 12 at the 12 o'clock position is bounded on one side by the elements 25' and on the other side by the elements 25''' and the next compartment 12 in the clockwise direction, at approximately the 2 o'clock position, is bounded on one side by the tensioning elements 25' and on the other side by the tensioning elements 25''. As a result, the tensioning elements on each side of the vertical compartments 12 are arranged in a symmetrical manner.

As can be seen in FIGS. 1 and 3, there are four tensioning elements 25 in each vertical row of the elements within each set. Within each vertical row the elements traverse the same chordal path and their ends are anchored within a common groove 27 on the exterior surface of the tank. As indicated in FIG. 1, in each vertical row the elements are numbered, starting downwardly from the upper layer, 28, 29, 30 and 31.

Taking the fastening elements 25' as an example, they extend across the tank in the horizontal direction, as viewed in FIG. 1, from a 1 o'clock position to a 7 o'clock position. From the 7 o'clock position the elements extend along their associated horizontal component 6 until they reach approximately the midpoint through the tank. At that location the elements reach the locations of the other two horizontal compartments 6. Since the horizontal compartments are left free of the tensioning elements, the elements must be displaced out of the path of the horizontal compartments. Accordingly, as can be noted in FIG. 1, the two upper layers 28, 29 of the tensioning elements are displaced upwardly over the compartment 6 in their path, while the other two lower layers 30, 31 are displaced downwardly passing under the compartment in their path. The rectilinear direction of the intermediate portions of the tensioning elements does not change, however, as viewed in vertical section as in FIG. 1, it can be noted that they are displaced upwardly and downwardly to avoid passing through the open space provided by the horizontal compartment 6. This arrangement is applicable to each set of tensioning elements 25', 25'', and 25'''.

In the developed view of the outer surface of the tank shown in FIG. 3, that portion of the tank corresponding to the vertical range of the tensioning elements 25 is shown. This is the same vertical range as the horizontal compartments 6. The showing in FIG. 3 extends from the opening C for one of the horizontal compartments to the opening B of another of the horizontal compartments, note FIG. 2. In each separate set of the tensioning elements 25', 25'', and 25''', the set includes eight vertical rows divided into four rows on each side of the associated horizontal compartment. Accordingly, as shown in FIG. 2, the rows of each set are designated A1-A8, B1-B8, and C1-C8. The opening B is flanked on one side by the vertical rows of tensioning elements B1-B4 and on the other side by the rows B5-B8. This same arrangement is true for each of the other two openings A and C.

While a specific embodiment of the invention has been shown and described in detail to illustrate the application of the inventive principles, it will be understood that the invention may be embodied otherwise without departing from such principles.

What is claimed is:

1. A cylindrically shaped prestressed concrete pressure tank for a nuclear reactor power plant in which a gas-cooled high-temperature reactor is used with at least one heat utilization circuit including a turbine, a compressor and heat exchange apparatus, said tank having a vertically extending cylindrical axis, an upper and a lower end each extending transversely of the cylindrical axis and an outer surface extending approximately concentrically about the cylindrical axis betwen the upper and lower ends, said tank forming a reactor chamber concentric to the cylindrical axis and spaced inwardly from the upper end, the lower end and the vertically extending outer surface of said tank, compartments enclosed within said tank and spaced from said reactor chamber for receiving the components of the heat utilization circuit and connecting piping between the reactor and the components, wherein the improvement comprises that said compartments includes a plurality of horizontally extending first compartments located below said reactor chamber and above the lower end of said tank for receiving a gas turboset, a plurality of vertically extending second compartments arranged in a circle concentric to said cylindrical axis and spaced outwardly from said reactor chamber and inwardly from the vertical outer surface of said tank, a plurality of vertically extending third compartments arranged in a circle concentric to the cylindrical axis of said tank with the circle having a greater diameter than the concentric circle of said second compartments, means for prestressing said tank including vertically disposed tensioning elements extending in the axial direction of said tank and generally horizontally disposed tensioning elements extending transversely of the axial direction, said generally horizontally disposed tensioning elements including first and second horizontally disposed tensioning element with said first tensioning element located approximately at the vertical height of said plurality of first compartments and extending chordally across said tank in the general direction of the axis of said first compartments, with one said set associated with each of the plurality of said first compartments, said first tensioning elements in each of the sets extending for a major portion of its length along a rectilinear chordal path approximately parallel with the axial direction of said first compartment with which it is associated, and said second tensioning elements encircling said outer surface of said tank above and below the vertical range of said tank in which said at least one first compartment is located.

2. A cylindrically shaped prestressed concrete pressure tank, as set forth in claim 1, wherein there horizontally extending said first compartments are provided in said tank below said reactor chamber with said first compartment disposed angularly apart and extending inwardly from the outer surface toward the axial center of said tank, said first compartments all located within the same vertical range of said tank, three sets of said first tensioning elements being provided in the vertical range of said first compartments with one said set associated with each of the three said first compartments.

3. A cylindrically shaped prestressed concrete pressure tank, as set forth in claim 2, wherein said first compartments are equiangularly spaced apart and said three sets of said first tensioning elements are also equiangularly spaced apart.

4. A cylindrically shaped prestressed concrete pressure tank, as set forth in claim 3, wherein each set of said first tensioning elements includes horizontally spaced said first tensioning elements with said horizontally spaced said first tensioning elements located on and positioned outwardly from the opposite horizontally extending sides of the associated said first compartment.

5. A cylindrically shaped prestressed concrete pressure tank, as set forth in claim 2, wherein said first tensioning elements have a longitudinally extending intermediate portion and an end portion extending from each of the ends of the intermediate portion to the ends of said tensioning element, the intermediate portion of each said first tensioning element in each of said sets extending along a rectilinear chordal path and the end portions of said first tensioning elements having a curvilinear shape from the intermediate portion to the adjacent end of said tensioning element.

6. A cylindrically shaped prestressed concrete pressure tank, as set forth in claim 4, wherein an anchoring element for each end of said first tensioning elements is located on the outer surface of said tank, and said anchoring members comprising first anchoring members located immediately adjacent said first compartment and second anchoring members spaced laterally from said first anchoring members, said second anchoring members being equidistantly spaced apart in the circumferential direction of said tank.

7. A cylindrically shaped prestressed concrete pressure tank, as set forth in claim 4, wherein each set of said first tensioning elements includes a plurality of vertically spaced said first tensioning elements arranged in a plurality of vertically extending rows with said first tensioning elements in each said vertical row extending along the same chordal path, at least one of said first tensioning elements in each vertical row being displaced upwardly for passing over one of said first compartments other than the one along which the set of said first tensioning elements extends and at least one other of said first tensioning elements in each vertical row displaced downwardly for passing under one of said first compartments other than the one along which the set of first tensioning elements extends.

8. A cylindrically shaped prestressed concrete pressure tank, as set forth in claim 6, wherein a groove is formed in the outer surface of said tank at the location of said anchoring members and the base of each said anchoring groove being disposed approximately perpendicularly to said first element secured to the anchoring member within said groove.

9. A cylindrically shaped prestressed concrete pressure tank, as set forth in claim 5, wherein said vertically extending third compartments are spaced laterally outwardly from said first compartments and extend downwardly through the vertical range of said tank containing said first compartments, the end portions of said first tensioning elements being curved outwardly from and around said third compartments.

10. A cylindrically shaped prestressed concrete pressure tank, as set forth in claim 2, wherein said first compartments extend inwardly from the outer surface of said tank so that each said first compartment has an opening in the outer surface of said tank, said first compartments are arranged to be pressurized, and a prestressed concrete plug inserted into the opening of each said first compartment located in the outer surface of said tank.

11. A cylindrically shaped prestressed concrete pressure tank, as set forth in claim 10, wherein channel members encircle said tank above and below the vertical range of the openings of said first compartment and said second tensioning elements are ring-shaped and are positioned in channels.

12. A cylindrically shaped prestressed concrete pressure tank, as set forth in claim 11, wherein said ring-shaped second tensioning elements are disposed in a number of rows in each said channel.

13. A cylindrically shaped prestressed concrete pressure tank, as set forth in claim 2, wherein said vertically disposed tensioning elements aligned above said first compartments are bent laterally out of the path of said first compartments in the vertical range thereof so that the opening through said tank formed by said first compartments is free of said tensioning elements.

* * * * *